(12) United States Patent
Norrell et al.

(10) Patent No.: US 7,190,716 B2
(45) Date of Patent: Mar. 13, 2007

(54) LINE POWERED LOOP EXTENDER WITH COMMUNICATIONS, CONTROL, AND DIAGNOSTICS

(75) Inventors: Andrew L. Norrell, Nevada City, CA (US); James T. Schley-May, Nevada City, CA (US)

(73) Assignee: 2Wire, Inc, San Jose, CA (US)

( * ) Notice: Subject to any disclaimer, the term of this patent is extended or adjusted under 35 U.S.C. 154(b) by 700 days.

(21) Appl. No.: 10/071,980

(22) Filed: Feb. 6, 2002

(65) Prior Publication Data

US 2002/0106076 A1 Aug. 8, 2002

Related U.S. Application Data

(60) Provisional application No. 60/267,241, filed on Feb. 6, 2001.

(51) Int. Cl.
*H04B 1/38* (2006.01)
(52) U.S. Cl. ............... 375/222; 375/211; 379/399.01
(58) Field of Classification Search ................. 375/222
See application file for complete search history.

(56) References Cited

U.S. PATENT DOCUMENTS

| | | | |
|---|---|---|---|
| 761,995 A | 6/1904 | Pupin | |
| 1,711,653 A | 5/1929 | Quarles | |
| 3,180,938 A | 4/1965 | Glomb | |
| 3,476,883 A | 11/1969 | Birck | |
| 3,548,120 A | 12/1970 | Tarassoff | |
| 3,578,914 A | 5/1971 | Simonelli | |
| 3,848,098 A | 11/1974 | Pinel | |
| 3,873,936 A | 3/1975 | Cho | |
| 3,944,723 A | 3/1976 | Fong | |
| 3,962,549 A | 6/1976 | Zuk | |
| 4,025,737 A | 5/1977 | Brewer | |
| 4,131,859 A | 12/1978 | Valle | |
| 4,242,542 A | 12/1980 | Kimbrough | |
| 4,259,642 A | 3/1981 | Derby | |
| 4,277,655 A | 7/1981 | Surprenant | |
| 4,282,407 A | 8/1981 | Stiefel | |

(Continued)

FOREIGN PATENT DOCUMENTS

JP 61159833 7/1986

OTHER PUBLICATIONS

Reference Data for Radio Engineers, Federal Telephone and Radio Company, Aug. 1944, p. 111.

(Continued)

*Primary Examiner*—Temesghen Ghebretinsae
*Assistant Examiner*—Juan Alberto Torres
(74) *Attorney, Agent, or Firm*—Blakely, Sokoloff, Taylor & Zafman LLP

(57) ABSTRACT

A Digital Subscriber Line (DSL) network for improving the transmission of DSL signals includes a plurality of local loops for transmission of upstream and downstream DSL signals, control signals, and Direct Current (DC) power, a plurality of loop extenders with communications, control, and diagnostic functionality for amplifying the DSL signals, a loop extender communications/power supply for receiving the DC power and control signals, providing DC power to the plurality of loop extenders, and broadcasting the received control signals to the plurality of loop extenders, and a central office controller/power supply for controlling access to the plurality of local loops and controlling the plurality of loop extenders.

49 Claims, 6 Drawing Sheets

U.S. PATENT DOCUMENTS

| | | |
|---|---|---|
| 4,392,225 A | 7/1983 | Wortman |
| 4,462,105 A | 7/1984 | Wagner et al. |
| 4,583,220 A | 4/1986 | Blackburn et al. |
| 4,633,459 A | 12/1986 | Blackburn |
| 4,656,628 A | 4/1987 | Tan |
| 4,667,319 A | 5/1987 | Chum |
| 4,766,606 A | 8/1988 | Bardutz et al. |
| 4,768,188 A | 8/1988 | Barnhart et al. |
| 4,788,657 A | 11/1988 | Douglas et al. |
| 4,970,722 A | 11/1990 | Preschutti |
| 5,049,832 A | 9/1991 | Cavers |
| 5,095,528 A | 3/1992 | Leslie et al. |
| 5,181,198 A | 1/1993 | Lechleider |
| 5,394,401 A | 2/1995 | Patrick et al. |
| 5,422,929 A * | 6/1995 | Hurst et al. ............ 379/4 |
| 5,455,538 A | 10/1995 | Kobayashi et al. |
| 5,526,343 A | 6/1996 | Aizawa et al. |
| 5,555,274 A | 9/1996 | Sheets |
| 5,623,485 A | 4/1997 | Bi |
| 5,678,198 A | 10/1997 | Lemson |
| 5,724,344 A | 3/1998 | Beck |
| 5,726,980 A | 3/1998 | Rickard |
| 5,736,949 A | 4/1998 | Ong et al. |
| 5,765,097 A | 6/1998 | Dail |
| 5,790,174 A | 8/1998 | Richard, III et al. |
| 5,822,325 A | 10/1998 | Segaram et al. |
| 5,825,819 A | 10/1998 | Cogburn |
| 5,859,895 A | 1/1999 | Pomp et al. |
| 5,892,756 A | 4/1999 | Murphy |
| 5,909,445 A | 6/1999 | Schneider |
| 5,912,895 A | 6/1999 | Terry et al. |
| 5,929,402 A | 7/1999 | Charles et al. |
| 5,974,137 A | 10/1999 | Sheets et al. |
| 5,991,311 A | 11/1999 | Long et al. |
| 6,005,873 A | 12/1999 | Amit |
| 6,029,048 A | 2/2000 | Treatch |
| 6,047,222 A | 4/2000 | Burns et al. |
| 6,058,162 A | 5/2000 | Nelson et al. |
| 6,084,931 A | 7/2000 | Powell, II et al. |
| 6,091,713 A | 7/2000 | Lechleider et al. |
| 6,091,722 A | 7/2000 | Russell et al. |
| 6,128,300 A | 10/2000 | Horton |
| 6,154,524 A | 11/2000 | Bremer |
| 6,188,669 B1 | 2/2001 | Bellenger |
| 6,195,414 B1 | 2/2001 | Simmons et al. |
| 6,208,670 B1 | 3/2001 | Milliron et al. |
| 6,226,322 B1 | 5/2001 | Mukherjee |
| 6,226,331 B1 | 5/2001 | Gambuzza |
| 6,236,664 B1 | 5/2001 | Erreygers |
| 6,236,714 B1 | 5/2001 | Zheng et al. |
| 6,246,695 B1 | 6/2001 | Seazholtz et al. |
| 6,262,972 B1 | 7/2001 | McGinn et al. |
| 6,263,047 B1 | 7/2001 | Randle et al. |
| 6,266,348 B1 | 7/2001 | Gross et al. |
| 6,266,395 B1 | 7/2001 | Liu et al. |
| 6,278,769 B1 | 8/2001 | Bella |
| 6,281,454 B1 | 8/2001 | Charles et al. |
| 6,301,337 B1 | 10/2001 | Scholtz et al. |
| 6,343,114 B1 | 1/2002 | Chea, Jr. |
| 6,345,071 B1 | 2/2002 | Hamdi |
| 6,345,072 B1 | 2/2002 | Liu et al. |
| 6,351,495 B1 | 2/2002 | Tarraf |
| 6,370,188 B1 | 4/2002 | Wu et al. |
| 6,385,234 B1 | 5/2002 | Ashley |
| 6,385,252 B1 | 5/2002 | Gradl et al. |
| 6,385,253 B1 | 5/2002 | Swisher |
| 6,466,656 B1 | 10/2002 | Evans et al. |
| 6,507,606 B2 * | 1/2003 | Shenoi et al. ............ 375/211 |
| 6,532,279 B1 | 3/2003 | Goodman |
| 6,546,100 B1 | 4/2003 | Drew |
| 6,658,049 B1 | 12/2003 | McGhee et al. |
| 6,681,012 B1 | 1/2004 | Gorcea et al. |
| 6,751,315 B1 | 6/2004 | Liu et al. |
| 6,829,292 B1 | 12/2004 | Shenoi |
| 2002/0001340 A1 | 1/2002 | Shenoi et al. |
| 2002/0061058 A1 | 5/2002 | Sommer |
| 2002/0090026 A1 | 7/2002 | Ashley |
| 2002/0105964 A1 | 8/2002 | Sommer et al. |
| 2002/0106012 A1 | 8/2002 | Norrell et al. |
| 2002/0106013 A1 | 8/2002 | Norrell et al. |
| 2002/0106076 A1 | 8/2002 | Norrell et al. |
| 2002/0110221 A1 | 8/2002 | Norrell et al. |
| 2002/0113649 A1 * | 8/2002 | Tambe et al. ............ 330/250 |
| 2002/0141569 A1 | 10/2002 | Norrell et al. |
| 2003/0051060 A1 | 3/2003 | Vitenberg |

OTHER PUBLICATIONS

Baker, Todd, The Challenges of Implementing, Oct. 1998, Tektronix, p. 2.

Vittore, Vince, Making DSL go for the Long Run, Telephony Magazine, Dec. 11, 2000, paragraph 11.

"Reference Data for Radio Engineers", Published by the Federal Telephone and Radio Corporation as associate of International Telephone and Telegraph Corporation, Copyright 1943, pp. 3.

Todd Baker, "The Challenges of Implementing", Tektronix, Oct. 1998 CTE Report, http://www.tektronix.org/Measurement/commtest/cte_reports/27/xdsl.html?view=print&page=http://ww,pp.5.

Vince Vittore, "Telephony Making DSL go for the long run", http://industryclick.com/magazinearticle.asp?magazinearticleid=7521&magazineid=7&mode=print, Dec. 11, 2000, pp. 2.

Orckit Communications Ltd "Copper Trunk HDSL Repeater" retrieved from http://web.archive.org/web/20001217100200/http://web.orckit.com/hdsl_repeater.html> retrieved Jul. 4, 2005. 2 pages.

Nilsson, J.W., and Riedel, S.A., "Electric Circuits", 1996, pp. 723-777, Fifth Edition, Addison-Wesley, Reading, MA.

Starr, Thomas, et al., "Understanding Digital Subscriber Line Technology," Prentice Hall PTR, Upper Saddle River, NJ, 07458, 1999, ISBN 0137805454. pp. 1-49 and 52.

Chen, Walter Y., "DSL Simulation Techniques and Standards Development for Digital Subscriber Line Systems", Macmillan Technical Publishing, Indianapolis, Indiana, ISBN 1578700175. pp. 33.

Smart Coil™ —"The line conditioner for the digital age! Smart Coils condition copper pairs for deployment of both ADSL (data) and toll-quality voice services on the same line", Charles a registered Trademark of Charles Industries, Ltd., 2 pages.

"Testing Inter-Winding Capacitance", Rhombus Industries, Inc., Huntington Beach, California, 1997, 1 page.

"Transformer General Parameters for Telecom Magnetic Component", Delta Products Corporation, Fremont, California, 1 page.

"Design Idea DI-61 TinySwitch®-II 3 W Charger: <200 mW No-Load Consumption", Power® Integrations, www.powerint.com, Mar. 2004, 2 pages.

"Lundahl Transformers, Tube amplifier transformers, OPTs, mains, and interstage transformers", http://www.lundahl.se/tubes.html, Apr. 13, 2004, pp. 1-7.

"TechEncyclopedia", TechWeb, http://www.techweb.com/encyclopedia/defineterm?term=dsl&x=20&y=5, Apr. 16, 2004, pp. 1-4.

Grossner, Nathan R., "The Wide-Band Transformer: Synthesis", and "The Pulse Transformer: Analysis", Transformers for Electronic Circuits, Copyright © 1967, by McGraw-Hill, pp. 225-252.

* cited by examiner

LINE POWERED LOOP EXTENDER WITH COMMUNICATIONS, CONTROL, AND DIAGNOSTICS

CROSS REFERENCE TO RELATED APPLICATIONS

This application is related to, and claims the benefit of, U.S. Provisional Patent Application No. 60/267,241, filed on Feb. 6, 2001 and entitled "Line Powered ADSL Repeater with Communications, Control, and Diagnostics." This application also relates to commonly assigned U.S. patent application Ser. No. 09/569,470, filed on May 12, 2000 and entitled "DSL Repeater," now abandoned, U.S. patent application Ser. No. 09/610,788, filed on Jul. 6, 2000 and entitled "DSP-Based Repeater for DSL Signals," now abandoned, U.S. patent application Ser. No. 09/670,475, filed on Sep. 26, 2000 and entitled "Load Coil And DSL Repeater Including Same," now issued as U.S. Pat. No. 7,072,385, U.S. patent application Ser. No. 10/072,833 filed on Feb. 6, 2002 and entitled "Loop Extender with Selectable Line Termination and Equalization," and U.S. patent application Ser. No. 10/072,091 filed on Feb. 6, 2002 and entitled "Loop Extender with Communications, Control, and Diagnostics." The disclosures of these related applications are hereby incorporated by this reference.

BACKGROUND OF THE INVENTION

1. Field of the Invention

The present system and method relate generally to Digital Subscriber Line (DSL) technology, and more particularly to a system and method for improving ADSL (Asymmetric DSL) and VDSL (Very high data rate DSL) system performance over long local loops.

2. Description of the Background Art

One method of accessing the Internet is by using DSL technology, which has several varieties, including ADSL and VDSL versions. ADSL is one version of DSL technology that expands the useable bandwidth of existing copper telephone lines. ADSL is "asymmetric" in that ADSL reserves more bandwidth in one direction than in the other, which may be beneficial for users who do not require equal bandwidth in both directions. In one implementation, ADSL signals generally occupy the frequency band between about 25 kHz and 1.104 MHz. In this configuration, ADSL uses the frequency band between about 25 kHz and 120 kHz to transmit upstream signals (signals from a customer premises to a central office) and the frequency band between about 150 kHz to 1.104 MHz to transmit downstream signals (signals from the central office to a customer premises).

ADSL employs Frequency Division Multiplexing (FDM) to separate upstream and downstream signals and to separate ADSL signals from POTS (Plain Old Telephone Service) band signals, which reside below 4 kHz. VDSL also uses FDM to separate downstream and upstream channels as well as to separate both downstream and upstream channels from POTS signals.

In the past, ADSL has been used to deliver high-speed data services to subscribers up to about 18,000 feet from their serving central office or central office extension. The potential data rates range from above about 8 MBPS for short loops, but drop off dramatically on long loops, such as local loops over about 18,000 feet, to about 0.5 MBPS or less. Conventionally, ADSL service generally employs a local loop length of about 6,000–14,000 feet for optimal service. Loop length is generally defined as the length of the wire between the central office, or central office extension, and the customer premises, such as a home or business. "Central office" and "central office extension" are collectively referred to herein as "central office."

DSL signals generally degrade as they traverse the local loop. Hence, the longer the local loop length, the more degraded the DSL signal will tend to be upon arriving at a central office or a customer premises. While some DSL service is conventionally possible with loop lengths longer than 14,000 feet, it has been found that with loops much longer than about 14,000 feet, the DSL signal is too degraded to provide high data transfer rates.

DSL signal degradation over a local loop may be caused, for example, by factors such as: signal attenuation, crosstalk, thermal noise, impulse noise, and ingress noise from commercial radio transmitters. The dominant impairment, however, is often signal attenuation. For example, a transmitted ADSL signal can suffer as much as 60 dB or more of attenuation on long loops, which substantially reduces the useable signal, greatly reducing potential data rates.

Additional details regarding DSL signal degradation over long loops and regarding DSL technology more generally are described in *Understanding Digital Subscriber Line Technology* by Starr, Cioffi, and Silverman, Prentice Hall 1999, ISBN 0137805454 and in *DSL—Simulation Techniques and Standards Development for Digital Subscriber Line Systems* by Walter Y. Chen, Macmillan Technical Publishing, ISBN 1578700175, the disclosures of which are hereby incorporated by reference.

SUMMARY OF THE INVENTION

In accordance with the present invention, a DSL network for improving the transmission of DSL signals is disclosed. The DSL network includes a plurality of local loops for transmission of upstream and downstream DSL signals, control signals, and DC power, a plurality of loop extenders with communications, control, and diagnostic functionality, a loop extender communications/power supply for receiving the DC power and control signals, providing DC power to the plurality of loop extenders, and broadcasting the received control signals to the plurality of loop extenders, and a central office controller/power supply for controlling access to the plurality of local loops and controlling the plurality of loop extenders.

In one embodiment of the present invention, the central office controller/power supply includes a central office power supply coupled to a first local loop of the plurality of local loops and coupled to a second local loop of the plurality of local loops for providing DC power to the first local loop and second local loop. In addition, the central office/controller power supply includes a first modem coupled to the first and second local loops for communication with the plurality of loop extenders, a processor coupled to the first modem, and loop extender management software executable by the processor for generating control signals. The processor sends the control signals to the first modem for transmission over the first local loop and the second local loop.

In one embodiment of the present invention, the loop extender communications/power supply couples the first local loop and the second local loop to the plurality of loop extenders. The loop extender communications/power supply includes a second modem for communication with the central office controller/power supply, where the first modem and the second modem communicate in a voice-frequency band. The second modem receives the control signals and broadcasts the received control signals to the plurality of loop extenders via the plurality of local loops. In addition, the loop extender communications/power supply includes a loop extender power supply that receives power via the first and second local loops and provides power to the plurality of loop extenders.

In one embodiment of the present invention, each loop extender of the plurality of loop extenders includes a POTS loading coils coupled to a local loop of the plurality of local loops, DSL amplification circuitry coupled to the local loop via bypass switches, an analog multiplexer/analog-to-digital converter (AMADC) coupled to the DSL amplification circuitry via diagnostic lines and control lines for sampling DSL signals via the diagnostic lines and controlling the DSL amplification circuitry via the control lines, and a diagnostic/control processor (DCP) coupled to the local loop and the AMADC for processing the control signals received via the local loop and processing the sampled DSL signals from the AMADC.

The DCP may process the sampled DSL signals to compute average power, peak power, root-mean-square power, and power spectral density. In addition, the DCP, upon processing the control signals, may uncouple the DSL amplification circuitry from the local loop by activating a deactivated bypass relay, or may couple the DSL amplification circuitry to the local loop by deactivating an activated bypass relay. Furthermore, the DCP, either upon processing the control signals or processing the sampled DSL signals, may instruct the AMADC to select switch states of the DSL amplification circuitry for improving performance of the DSL amplification circuitry.

DETAILED DESCRIPTION OF THE DRAWINGS

Figure 1:
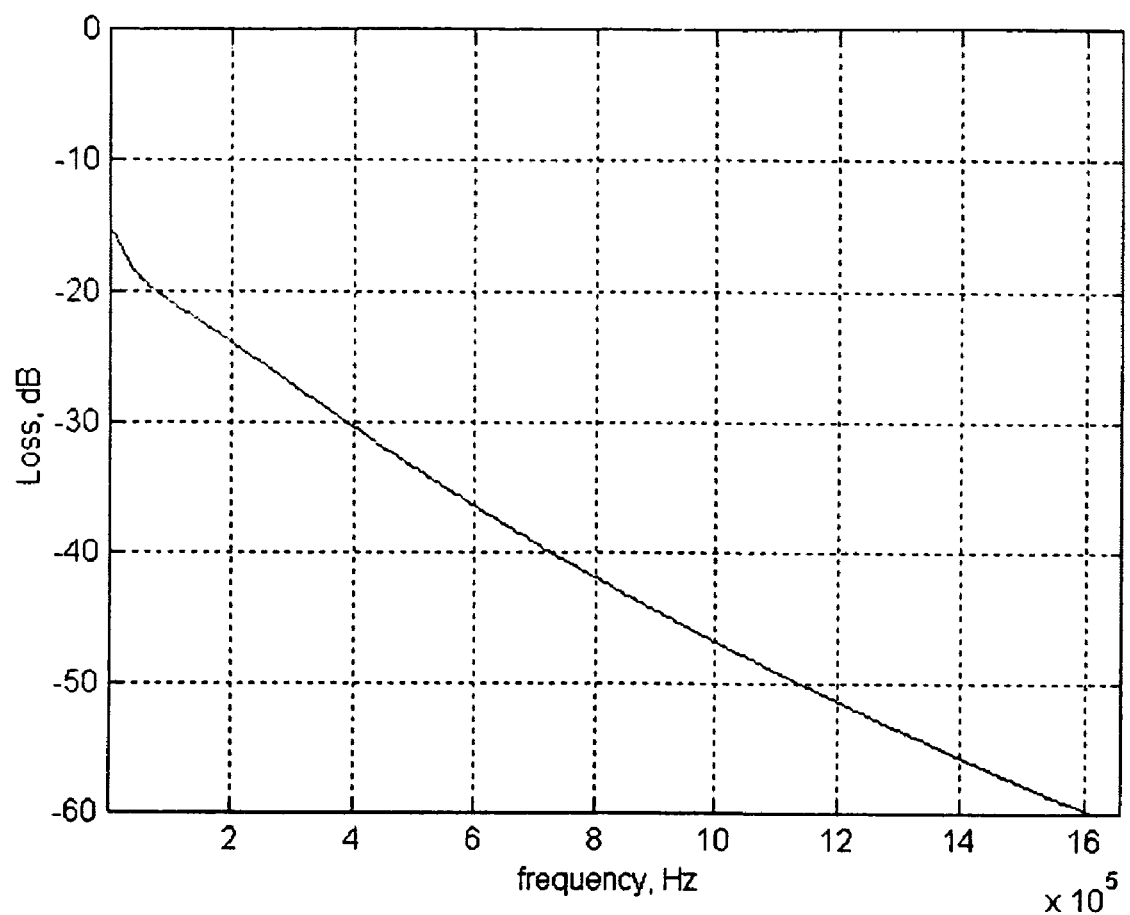
FIG. 1 is a graph illustrating one example of DSL signal attenuation over a 6,000-foot length of telephone cable as a function of signal frequency.

FIG. 1 illustrates an example of the attenuation of a DSL signal over 6,000 feet of 26 AWG (American Wire Gauge) telephone cable. As shown, higher frequency signals are generally attenuated more than lower frequency signals. In the FIG. 1 example, a 250 kHz signal is attenuated by about 25 dB over 6,000 feet of 26 AWG telephone cable while a 1 MHz signal is attenuated by about 46 dB over 6,000 feet of 26 AWG telephone cable. As those skilled in the art will appreciate, the actual degree of attenuation will also depend on factors in addition to loop length, such as temperature.

Figure 2:
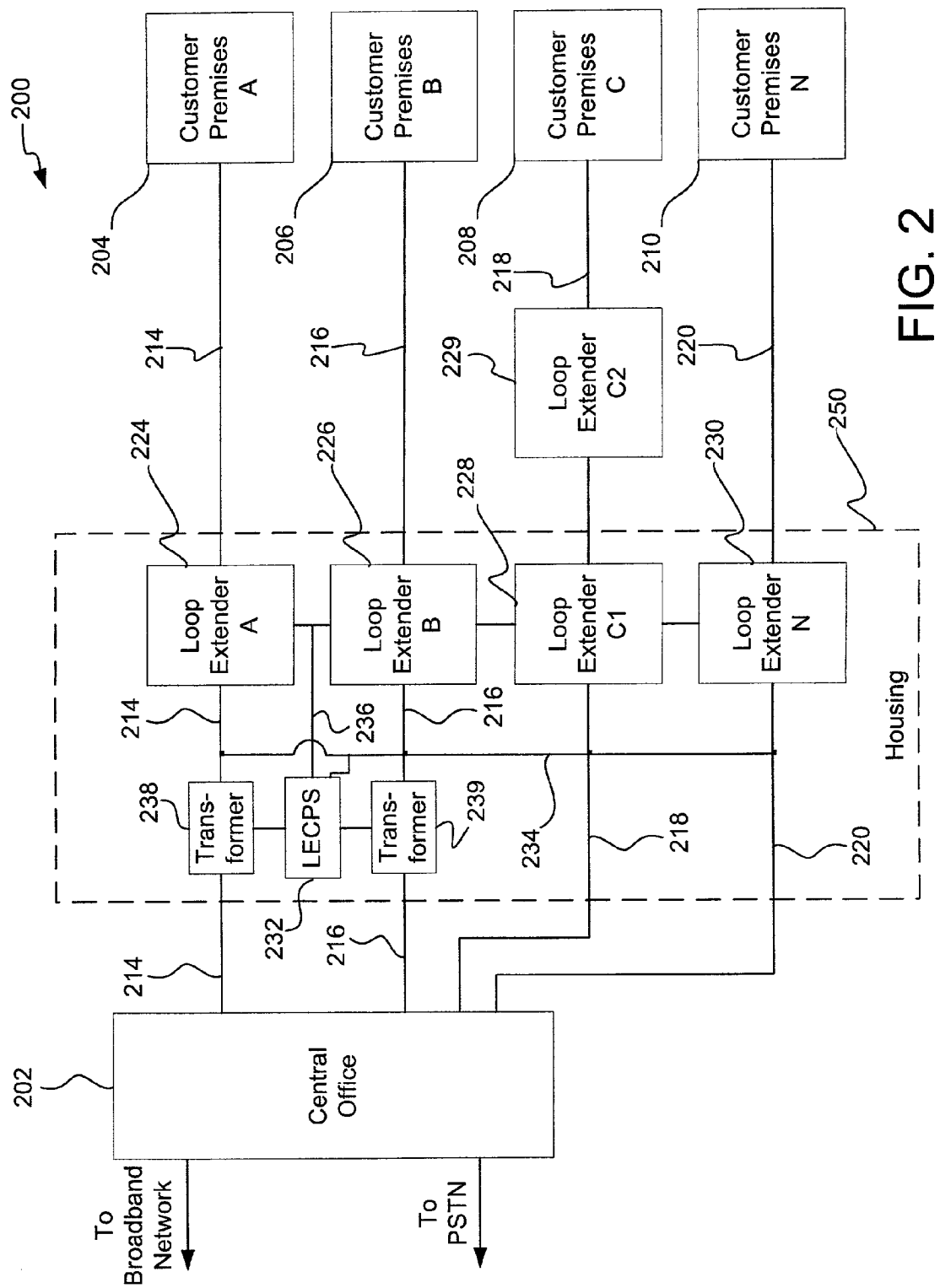
FIG. 2 illustrates one embodiment of a DSL network according to the invention.

FIG. 2 illustrates one embodiment of a DSL network 200 that includes a central office 202, a customer premises A 204, a customer premises B 206, a customer premises C 208, and a customer premises N 210. Customer premises 204, 206, 208, and 210 are respectively coupled to central office 202 by local loops 214, 216, 218, and 220. Each local loop comprises a twisted pair of copper wires; commonly known in the art as a "twisted pair." Typically, the copper wires are formed of 22, 24, or 26 AWG wire.

Moreover, as those skilled in the art will appreciate, central office 202 and each of customer premises 204, 206, 208, and 210 includes a DSL termination device, such as a DSL modem, for transmitting and receiving DSL signals over an associated local loop. Details of central office 202 will be discussed further below in conjunction with FIGS. 3–4.

A loop extender 224 is coupled to local loop 214 to amplify DSL signals, such as ADSL or VDSL signals, passing over local loop 214 between central office 202 and customer premises 204. As discussed above, DSL signals are generally attenuated as they travel along a local loop, such as local loop 214. Loop extender 224 is disposed along local loop 214 between central office 202 and customer premises 204 to at least partially compensate for the DSL signal attenuation by amplifying the transmitted DSL signals. Additional details of loop extender 224 are described below with reference to FIG. 6.

In addition, a loop extender 226 is coupled to local loop 216 between central office 202 and customer premises 206 to amplify DSL signals passing between central office 202 and customer premises 206. Likewise, a loop extender 230 is disposed between central office 202 and customer premises 210 to amplify DSL signals passing therebetween. Loop extenders 226 and 230 are configured the same as loop extender 224.

Further, FIG. 2 illustrates that multiple loop extenders may be coupled in series, or in cascaded fashion, to a single loop for amplifying transmitted DSL signals multiple times and in multiple locations between a customer premises and central office 202 to permit DSL signals to be transmitted over greater distances while still maintaining an acceptable DSL signal amplitude. Specifically, loop extender 228 and loop extender 229 are coupled in series to local loop 218, which couples central office 202 and customer premises 208. Pursuant to this configuration, loop extender 228 first amplifies a downstream DSL signal transmitted from central office 202 over local loop 218 to customer premises 208 and loop extender 229 then amplifies the downstream signal again.

Hence, loop extender 228 amplifies the downstream signal to at least partially compensate for the attenuation incurred as the downstream signal passes over the portion of local loop 218 between central office 202 and loop extender 228. Next, loop extender 229 amplifies the downstream signal to at least partially compensate for the attenuation incurred as the downstream signal passes from loop extender 228 to loop extender 229.

Likewise, for upstream DSL signals from customer premises 208 to central office 202, loop extender 229 amplifies the upstream signals to at least partially compensate for the attenuation that occurs between customer premises 208 and loop extender 229. Next, loop extender 228 amplifies the upstream signal to at least partially compensate for the attenuation incurred as the upstream signal passes from loop extender 229 over local loop 218 to loop extender 228.

According to one embodiment, loop distance between loop extenders 228 and 229 is between about 5,000 and 7,000 feet. In a preferred embodiment, the loop distance between loop extenders 228 and 229 is about 6,000 feet. As discussed in more detail below, this loop distance between multiple loop extenders disposed in series, in cascaded fashion, along a single local loop may be advantageous in that pursuant to other embodiments of the present system and method, each loop extender may be adapted with POTS loading coils. These other embodiments may then replace conventional POTS loading coils, which are disposed about every 6,000 feet along a local loop to provide both POTS loading and DSL signal amplification functionality. Additional details of these other embodiments are discussed below with reference to FIG. 6.

Local loop 218 is illustrated as having two cascaded loop extenders 228 and 229 coupled thereto between central office 202 and customer premises 208. It should be noted, however, that additional loop extenders (not shown) may be disposed in series between central office 202 and customer premises 208 so that DSL signals may be effectively transmitted over an even longer local loop 218 by being amplified multiple times by multiple loop extenders.

As discussed further below in conjunction with FIGS. 3–4, central office 202 is configured to generate and send control signals to loop extender communications/power supply (LECPS) 232 via local loop 214, local loop 216, and transformers 238–239. In addition, central office 202 is configured to provide DC power to LECPS 232 via local loop 214, local loop 216, and transformers 238–239. As discussed further below in conjunction with FIG. 5, LECPS 232 provides DC power to loop extenders 224, 226, 228, and 230 via line 236. Although not separately illustrated, loop extender 229 may receive DC power from a separate dedicated twisted pair or may receive DC power from LECPS 232. In addition, LECPS 232 broadcasts the received control signals to loop extenders 224, 226, 228, and 230 via line 234 and local loops 214, 216, 218, and 220, respectively. In one embodiment, each loop extender is assigned an IP address upon installation, so each control signal may be addressed to a specific loop extender by including the loop extender's IP address in a control signal header, for example. Lastly, LECPS 232; transformers 238–239; loop extenders 224, 226, 228, and 230; and the associated circuitry may be disposed in a common housing 250.

As illustrated in the FIG. 2 embodiment of the invention, local loops 218 and 220 may transmit DSL signals, POTS signals, and control signals. Furthermore, local loops 214 and 216 may transmit DC power, control signals, and DSL signals, however local loops 214 and 216 may not transmit POTS signals.

Figure 3:
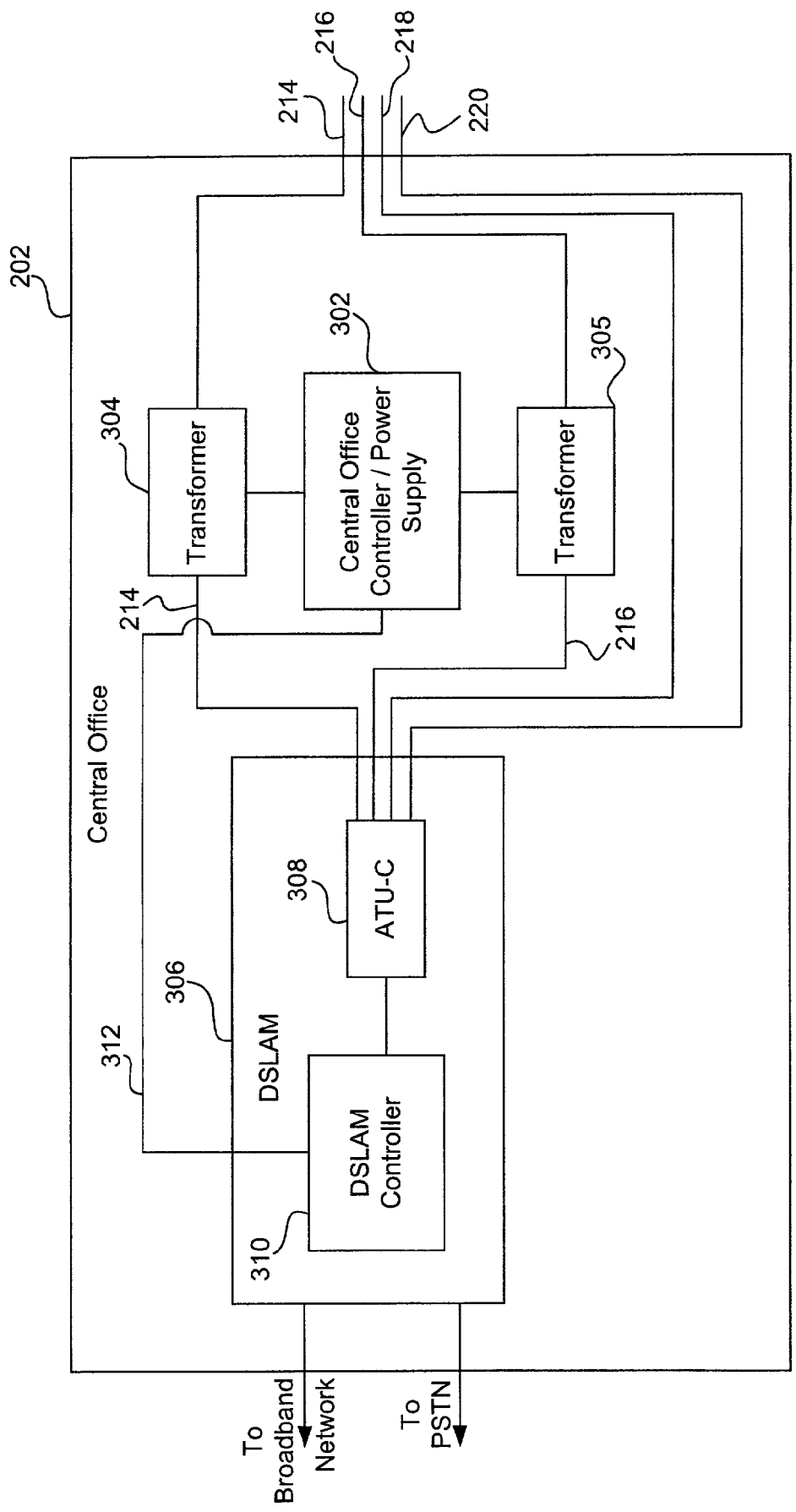
FIG. 3 illustrates one embodiment of a FIG. 2 central office.

FIG. 3 is a block diagram of one embodiment of central office 202. Central office 202 includes a central office controller/power supply (COCPS) 302 for generating control signals and DC power, transformers 304 and 305 for coupling the DC power and control signals generated by COCPS 302 to local loops 214 and 216 for transmission to LECPS 232, and a Digital Subscriber Line Access Multiplexer (DSLAM) 306 to transmit DSL signals onto the local loops and receive DSL signals from the local loops. DSLAM 306 also transmits DSL signals and POTS signals to broadband networks and the public switched telephone networks (PSTN) and receives DSL signals and POTS signals from broadband networks and the PSTN.

DSLAM 306 includes an ADSL Termination Unit—Central Office (ATU-C) 308 and a DSLAM controller 310. ATU-C 308 is an ADSL modem for receiving and transmitting DSL signals. DSLAM controller 306 controls the operation of the local loops via ATU-C 308 and communicates with COCPS 302 via line 312. For example, COCPS 302 may send DSLAM controller 310 instructions regarding the operation of ATU-C 308. Furthermore, COCPS 302 may receive local loop information from DSLAM controller 310.

COCPS 302 is configured to perform communications, control, and diagnostic (CCD) operations on a loop extender via LECPS 232 and local loops 214 and 216 by selecting the loop extender using the loop extender's IP address, generating control signals associated with a designated mode of loop extender operation, transmitting the control signals to the selected loop extender via LECPS 232 and local loops 214 and 216 to place the selected loop extender in the designated mode of operation, and receiving signals and data from the selected loop extender via LECPS 232 and local loops 214 and 216 in response to the transmitted control signals. COCPS 302 is also configured to supply DC power to LECPS 232 via local loops 214 and 216.

Figure 4:
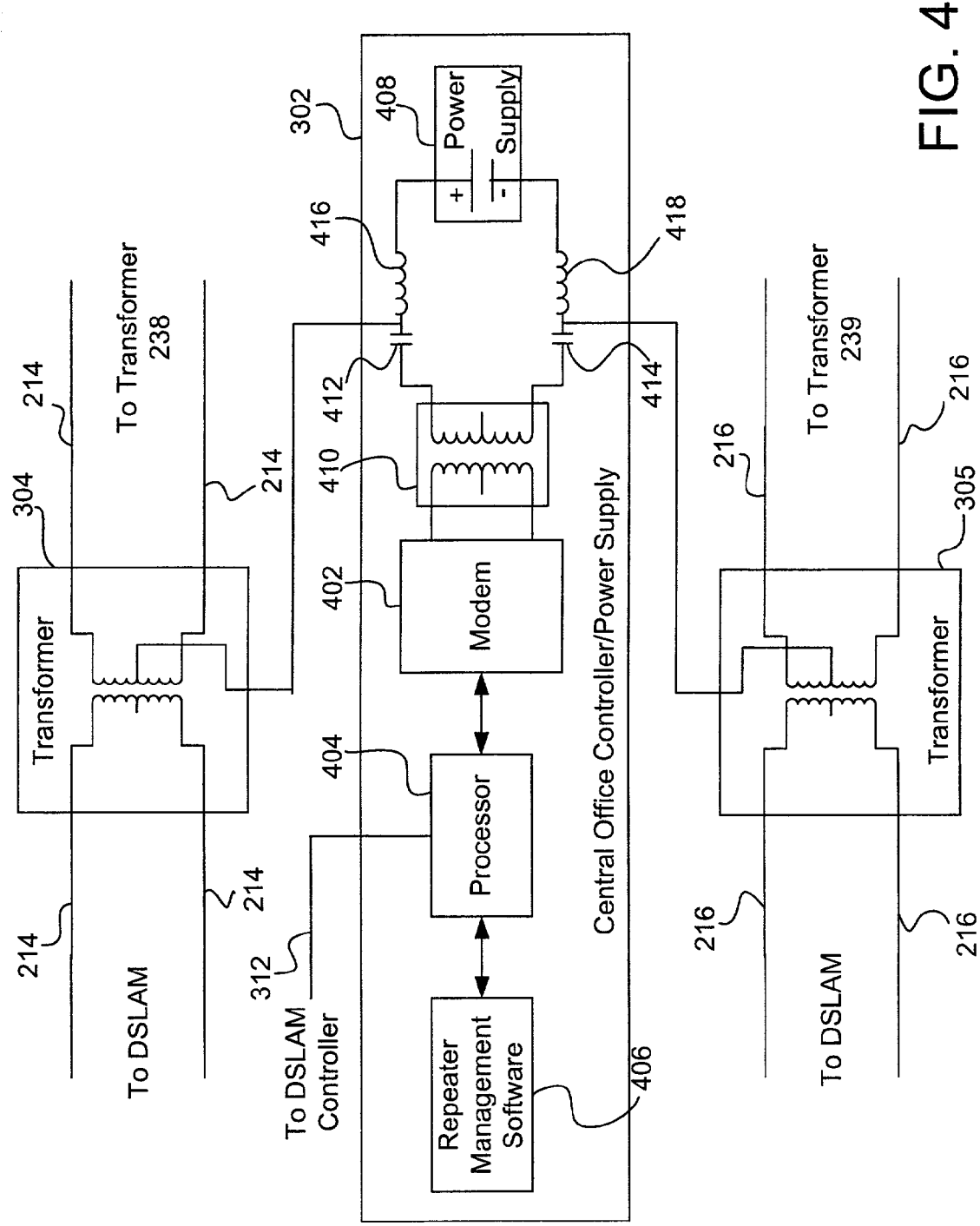
FIG. 4 illustrates one embodiment of a FIG. 3 central office controller/power supply coupled to transformers.

FIG. 4 is a block diagram of COCPS 302 and transformers 304–305. In the FIG. 4 embodiment of the invention, COCPS 302 includes a modem 402, a processor 404, loop extender management software 406, and a central office power supply 408. Processor 404 executes loop extender management software 406 for providing communications, control, and diagnostics functionality to a selected loop extender and generates control signals, determines an IP address of the selected loop extender, and sends the control signals to modem 402 for transmission to the selected loop extender.

Modem 402 is coupled to transformers 304–305 via transformer 410 and DC blocking capacitors 412 and 414. Transformers 304–305 are center-tapped transformers. DC blocking capacitors 412 and 414 isolate transformer 410 from DC power generated by central office power supply 408. Modem 402 transmits the control signals received from processor 404 to the selected loop extender via center-tapped windings of transformers 304–305. Modem 402 preferably transmits the control signals in the voice-frequency band. Voice-frequency band control signals are advantageously transmitted to the selected loop extender via the POTS loading coils of one or more loop extenders on the local loop without significant control signal attenuation or impairment by the POTS loading coils. Modem 402 may be a V.22 or Bell 212 standard modem configured for leased line operation and may be set to operate at relatively low power to avoid electrical interference with other signals present on the local loops. The FIG. 4 embodiment of the present invention may also be configured with other standard modems, such as a Bell 208, V.29, or V.33 standard modem, for example.

As illustrated in the FIG. 4 embodiment of the invention, a positive node of central office power supply 408 is coupled to a center tap of a winding of transformer 304 via inductor 416 and a negative node of central office power supply 408 is coupled to a center tap of a winding of transformer 305 via inductor 418. Inductors 416 and 418 isolate central office power supply 408 from high-frequency signals that may be present on local loop 214 and 216. If central office power supply 408 supplies DC power at ±190 volts measured at the positive and negative nodes, respectively, then the differential DC voltage measured between local loop 214 and local loop 216 is 380 volts.

Figure 5:
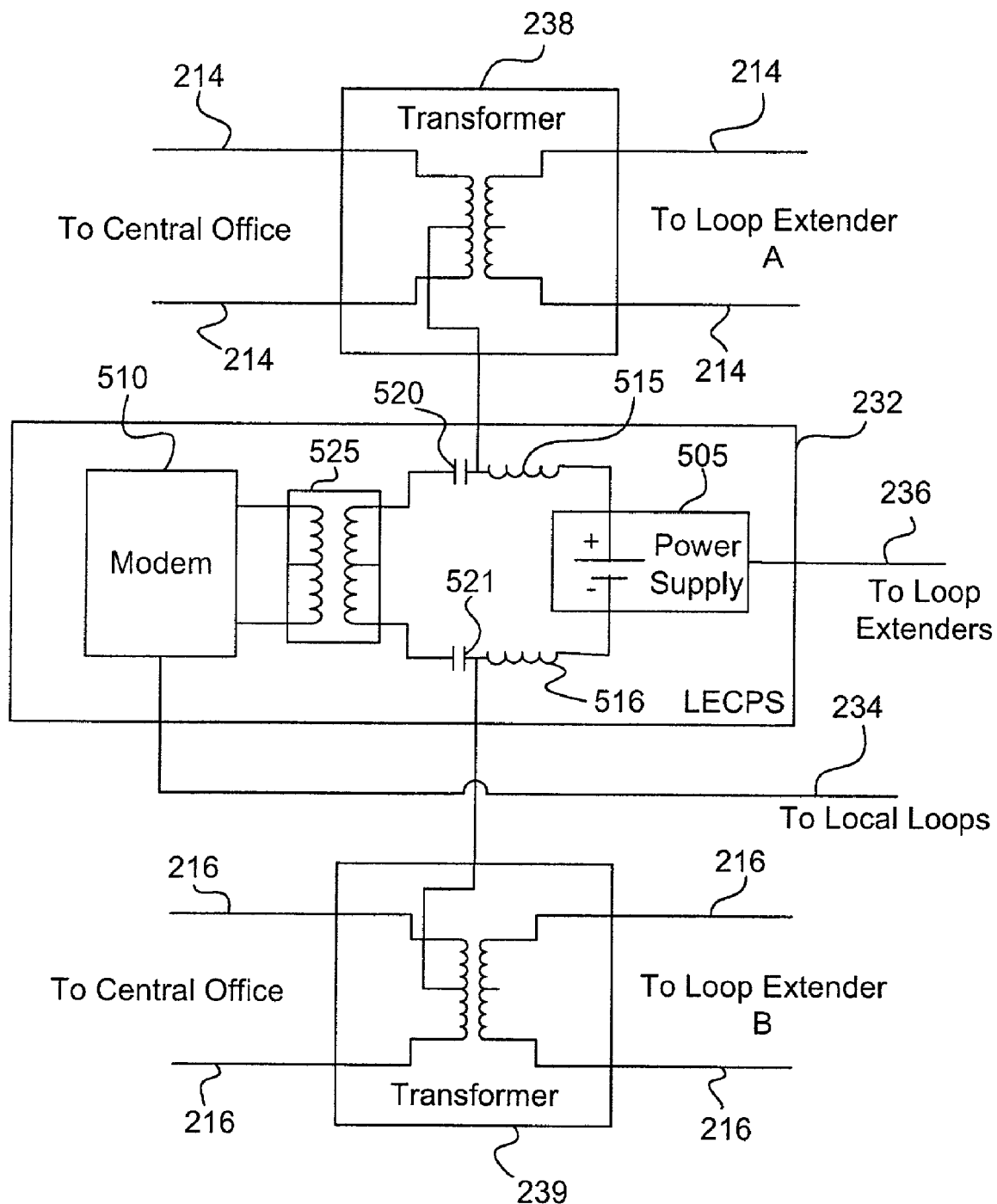
FIG. 5 illustrates one embodiment of a FIG. 2 loop extender communications/power supply coupled to transformers.

FIG. 5 is a block diagram of LECPS 232 and transformers 238–239. Transformers 238–239 receive downstream DSL signals from the central office side of local loops 214 and 216 and send the downstream DSL signals onto the customer premises side of local loops 214 and 216, receive upstream DSL signals from the customer premises side of local loops 214 and 216 and send the upstream DSL signals onto the central office side of local loops 214 and 216, and receive control signals and DC power from the central office side of local loops 214 and 216 and send the control signals and DC power to LECPS 232.

LECPS 232 includes a power supply 505 for receiving the power from transformers 238–239 and providing power to loop extenders 224, 226, 228, and 230 via line 236. A positive node of power supply 505 is coupled to a center-tapped winding of transformer 238 via inductor 515 and a negative node of power supply 505 is coupled to a center-tapped winding of transformer 239 via inductor 516. Inductors 515–516 isolate power supply 505 from high-frequency signals that may be present on local loops 214 and 216.

Furthermore, LECPS 232 includes a modem 510 for receiving the control signals and broadcasting the control signals to loop extenders 224, 226, 228, and 230 via line 234 and local loops 214, 216, 218, and 220, respectively. Modem 510 receives the control signals via capacitors 520–521 and transformer 525. Capacitors 520–521 isolate modem 510 from DC voltages that may be present on local loops 214 and 216. Modem 510 may be a standard voice frequency modem, such as a Bell 208, a Bell 212, a V.22, a V.29, or a V.33 modem, for example.

Figure 6:
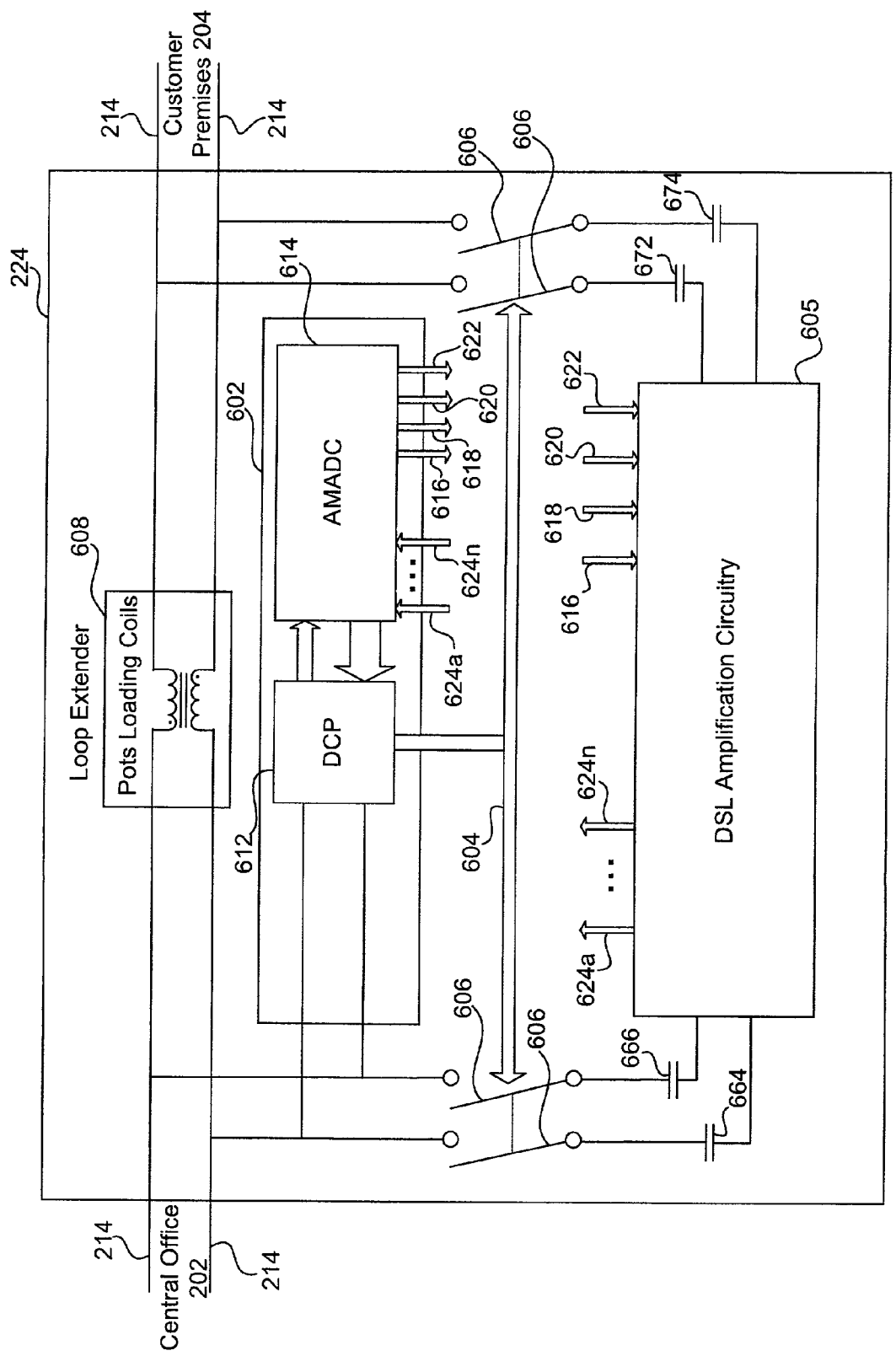
FIG. 6 illustrates one embodiment of a FIG. 2 loop extender.

FIG. 6 is a block diagram of one embodiment of loop extender 224. Loop extender 224 of FIG. 6 includes DSL amplification circuitry 605 for amplifying the DSL signals, a diagnostic/control unit (DCU) 602 for controlling the DSL amplification circuitry 605, and POTS loading coils 608 coupled to local loop 214 for amplifying POTS signals transmitted over local loop 214. DCU 602 includes a diagnostic/control processor (DCP) 612, and an analog multiplexer/analog-to-digital converter (AMADC) 614 connected in series.

DCP 612 receives control signals from local loop 214, processes the control signals, sends the processed control signals to AMADC 614, receives data from AMADC 614, analyzes some or all of the received data, and sends the analyzed and unanalyzed data to COCPS 302 via LECPS 232. AMADC 614 controls the state of DSL amplification circuitry switches (not shown) via switch control lines 616, 618, 620, and 622 upon receiving the processed control signals from DCP 612. Although four switch control lines are shown, the scope of the invention includes any number of switch control lines for controlling any number of DSL amplification circuitry switches. AMADC 614 may also sample DSL signal data at locations (not shown) in the DSL amplification circuitry 605 via a plurality of diagnostic lines 624, and send the sampled data to DCP 612 for analysis. The sampling of DSL signal data via diagnostic lines 624, the control of DSL amplification circuitry via switch control lines 616, 618, 620, 622 and DSL amplification circuitry switches, and details of DSL amplification circuitry 605 and POTS loading coils 608 are disclosed in U.S. patent application Ser. No. 10/072,091, entitled "Loop Extender with Communications, Control and Diagnostics" filed on Feb. 6, 2002, and U.S. patent application Ser. No. 10/072/833, entitled "Loop Extender with Selectable Line Termination and Equalization" filed on Feb. 6, 2002

In the FIG. 6 embodiment of the present invention, COCPS 302 issues control signals to DCP 612 via LECPS 232 and local loop 214. Control signals issued by COCPS 302 may be based upon performance characteristics of loop extender 224, desired DSL signal amplification of loop extender 224, or local line conditions, for example. DCP 612 receives and processes the control signals and instructs AMADC 614 to select states for DSL amplification circuitry switches via switch control lines 616, 618, 620, and 622. Furthermore, in a normal state of operation, DSL amplification circuitry 605 is electrically coupled to local loop 214 via switches 606. DCP 612, upon receiving control signals from COCPS 302 via LECPS 232, may decouple DSL amplification circuitry 605 from local loop 214 by activating a bypass relay 604. When bypass relay 604 is activated, switches 606 are open and DSL amplification circuitry 605 is electrically decoupled from local loop 214.

In another embodiment of the present invention, the selection of states for DSL amplification circuitry switches via switch control lines 616, 618, 620, and 622 is based upon DSL signals sampled by AMADC 614 at locations (not shown) within DSL amplification circuitry 605 via diagnostic lines 624. For example, AMADC 614 samples DSL signals within DSL amplification circuitry 605 via diagnostic lines 624, and sends the sampled DSL signals to DCP 612. DCP 612 analyzes the sampled DSL signals to determine loop extender performance, and based upon the analyzed DSL signals, may instruct AMADC 614 to select alternate states for DSL amplification circuitry switches via switch control lines 616, 618, 620, and 622 to improve loop extender performance. Alternatively, DCP 612 sends the sampled DSL signals to COCPS 302 for further processing and evaluation. COCPS 302 then issues control signals to DCP 612 via LECPS 232 and local loop 214 to select alternate states for DSL amplification circuitry switches.

In performing communications, control, and diagnostic operations, COCPS 302 may place a loop extender in one of several modes of operation. For example, COCPS 302 may place loop extender 224 in Bypass Mode by sending loop extender 224 control signals that instruct DCP 612 to activate bypass relay 604. Upon activation, bypass relay 604 opens switches 606 and electrically decouples DSL amplification circuitry 605 from local loop 214. A loop extender in Bypass Mode does not amplify DSL signals. A loop extender may be placed in Bypass Mode if the loop extender is not needed, malfunctioning, or is taken off line for scheduled maintenance, for example. Furthermore, if a loop extender is in Bypass Mode, COCPS 302 may place the loop extender in normal mode by sending control signals that instruct DCP 612 to deactivate bypass relay 604.

COCPS 302 may place a loop extender 224 in Signal Measurement Mode (SMM). COCPS 302 places loop extender 224 in SMM to extract loop extender performance data from DSL signals sampled via diagnostic lines 624. Typically, COCPS 302 does not place loop extender 224 in SMM unless DSL signals are present on local loop 214. For example, COCPS 302 sends control signals to DCP 612 via LECPS 232 and local loop 214, and DCP 612 instructs AMADC 614 to select one or more diagnostic lines 624. AMADC 614 then samples DSL signals via the selected diagnostic lines 624, and sends the sampled data to DCP 612. DCP 612 analyzes the data according to criteria specified by the control signals. For example, DCP 612 may compute an average power, a peak power, a root-mean-square (rms) power, a peak-to-rms power ratio, and a power spectral density, for example. The scope of the present invention includes other data analysis criteria well known in the art. DCP 612 sends the analyzed data to COCPS 302 via LECPS 232 and local loop 214. DCP 612 may also send unanalyzed data to COCPS 302. COCPS 302 uses the analyzed and unanalyzed data to determine performance of loop extender 224 and to determine other loop extender configurations for maximum loop extender performance. COCPS 302 may determine other loop extender configurations by computing adjustments to electrical elements comprising DSL amplification circuitry 605.

COCPS 302 may place a selected loop extender in a Power Analysis Mode. COCPS 302 places loop extender 224 in Power Analysis Mode to analyze loop extender power consumption by measuring currents and voltages at several diagnostic points in DSL amplification circuitry 605 (not shown). For example, AMADC 614 receives current and voltage data measured at several diagnostic points via diagnostic 624. AMADC 614 sends the current and voltage data to DCP 612. DCP 612 uses the current and voltage data to compute power consumption data and sends the power consumption data to COCPS 302. COCPS 302 may use the power consumption data to remotely identify problems with loop extender circuitry performance so that technicians may be dispatched to the proper location to replace faulty equipment.

The invention has been explained above with reference to specific embodiments. Other embodiments will be apparent to those skilled in the art in light of this disclosure. The present invention may readily be implemented using configurations other than those described in the embodiments above. Additionally, the present invention may effectively be used in conjunction with systems other than the one described above. Therefore, these and other variations upon the above embodiments are intended to be covered by the present invention, which is limited only by the appended claims.

What is claimed is:

1. A system for improving transmission of Digital Subscriber Line (DSL) signals, the system comprising:
   a plurality of loop extenders coupled to a plurality of local loops for amplifying upstream and downstream DSL signals transmitted over a first local loop and a second local loop selected from the plurality of local loops; and
   a loop extender communications module having a power supply coupled to the first local loop and the second local loop for receiving power and control signal and providing power and control signal to the first local loop and the second local loop, and coupled to the plurality of loop extenders for providing the control signal and power to the plurality of loop extenders.

2. The system of claim 1, further comprising a central office controller having a power supply, wherein the central office controller having a power supply is coupled to the first local loop via a first transformer and coupled to the second local loop via a second transformer.

3. The system of claim 2, wherein the central office controller having a power supply includes a central office power supply, a positive node of the central office power supply being inductively coupled to a center tap of the first transformer and a negative node of the central office power supply being inductively coupled to a center tap of the second transformer.

4. The system of claim 1, wherein the loop extender communications module having a power supply is coupled to the first local loop via a third transformer and coupled to the second local loop via a fourth transformer.

5. The system of claim 4, wherein the loop extender communications module having a power supply includes a loop extender power supply, a positive node of the loop extender power supply being inductively coupled to a center tap of the third transformer and a negative node of the loop extender power supply being inductively coupled to a center tap of the fourth transformer.

6. The system of claim 5, wherein the loop extender power supply is coupled to the plurality of loop extenders for providing power to the plurality of loop extenders.

7. The system of claim 1, wherein:
   the central office controller having a power supply includes
      a first modem for communication with the plurality of loop extenders,
      a processor coupled to the first modem, and
      loop extender management software executable by the processor for generating control signals; and
   the loop extender communications module having a power supply includes
      a second modem for communication with the central office controller having a power supply.

8. The system of claim 7, wherein the first modem is coupled to the first local loop via a first transformer and coupled to the second local loop via a second transformer, and the second modem is coupled to the first local loop via a third transformer and coupled to the second local loop via a fourth transformer.

9. The system of claim 7, wherein the first modem is coupled to a center tap of the first transformer via a first capacitor and coupled to a center tap of the second transformer via a second capacitor, and the second modem is coupled to a center tap of the third transformer via a third capacitor and coupled to a center tap of the fourth transformer via a fourth capacitor.

10. The system of claim 9, wherein a fifth transformer couples the first capacitor and the second capacitor to the first modem, and a sixth transformer couples the third capacitor and the fourth capacitor to the second modem.

11. The system of claim 10, wherein the first modem and the second modem communicate in a voice-frequency band.

12. The system of claim 8, wherein the processor sends the control signals to the first modem for transmission over the first local loop and the second local loop.

13. The system of claim 12, wherein the second modem receives the control signals and broadcasts the received control signals to the plurality of loop extenders via the plurality of local loops.

14. The system of claim 13, wherein each loop extender of the plurality of loop extenders includes:
   a Plain Old Telephone Service (POTS) loading coils coupled to a local loop of the plurality of local loops;
   DSL amplification circuitry coupled to the local loop via bypass switches;
   an analog multiplexer and analog-to-digital converter (AMADC) coupled to the DSL amplification circuitry via diagnostic lines and control lines for sampling DSL signals via the diagnostic lines and controlling the DSL amplification circuitry via the control lines; and
   a diagnostic and control processor (DCP) coupled to the local loop and the AMADC for processing the control signals received via the local loop and processing the sampled DSL signals from the AMADC.

15. The system of claim 14, wherein the DCP processes the sampled DSL signals to compute average power.

16. The system of claim 14, wherein the DCP processes the sampled DSL signals to compute peak power.

17. The system of claim 14, wherein the DCP processes the sampled DSL signals to compute root-mean-square power.

18. The system of claim 14, wherein the DCP processes the sampled DSL signals to compute power spectral density.

19. The system of claim 14, wherein each loop extender of the plurality of loop extenders includes a bypass relay for coupling the DCP to the bypass switches.

20. The system of claim 19, wherein the DCP, upon processing the control signals, uncouples the DSL amplification circuitry from the local loop by activating a deactivated bypass relay.

21. The system of claim 19, wherein the DCP, upon processing the control signals, couples the DSL amplification circuitry to the local loop by deactivating an activated bypass relay.

22. The system of claim 14, wherein the DCP, upon processing the control signals, instructs the AMADC to select switch states of the DSL amplification circuitry for improving performance of the DSL amplification circuitry.

23. The system of claim 14, wherein the DCP, upon processing the sampled DSL signals, instructs the AMADC to select switch states of the DSL amplification circuitry for improving performance of the DSL amplification circuitry.

24. A method for improving transmission of DSL signals, the method comprising:
providing power to a loop extender communications module having a power supply by supplying a voltage between a first local loop of a plurality of local loops and a second local loop of the plurality of local loops for providing power to a plurality of loop extenders; and
transmitting control signals to a loop extender communications module having a power supply via the first local loop and the second local loop, receiving the control signals, and broadcasting the control signals via the loop extender communications module having a power supply to the plurality of loop extenders.

25. The method of claim 24, wherein the control signals are broadcasted in a voice-frequency band.

26. The method of claim 24, wherein each loop extender, upon receiving a broadcast control signal, samples DSL signals.

27. The method of claim 26, wherein each loop extender processes the sampled DSL signals to compute average power.

28. The method of claim 26, wherein each loop extender processes the sampled DSL signals to compute peak power.

29. The method of claim 26, wherein each loop extender processes the sampled DSL signals to compute root-mean-square power.

30. The method of claim 26, wherein each loop extender processes the sampled DSL signals to compute power spectral density.

31. The method of claim 24, wherein the method further includes the step of amplifying upstream and downstream DSL signals via DSL amplification circuitry.

32. The method of claim 31, wherein each loop extender, upon receiving a broadcast control signal, uncouples the DSL amplification circuitry from the local loop.

33. The method of claim 31, wherein each loop extender, upon receiving a broadcast control signal, couples the DSL amplification circuitry to the local loop.

34. The method of claim 24, wherein each loop extender, upon receiving a broadcast control signal, selects switch states of the DSL amplification circuitry according to the broadcast control signal for improving performance of the DSL amplification circuitry.

35. The method of claim 24, wherein each loop extender, upon receiving a broadcast control signal, samples the DSL signals and selects switch states of the DSL amplification circuitry according to the sampled DSL signals for improving performance of the DSL amplification circuitry.

36. A system for improving transmission of DSL signals, the system comprising:
means for transmitting DSL signals;
means for amplifying the transmitted DSL signals;
first means for providing power to the means for amplifying;
second means for providing power via the means for transmitting DSL signals to the first means for providing power;
means for controlling the means for amplifying to improve performance of the means for amplifying;
means for broadcasting to the means for controlling;
means for generating control signals;
means for sending the control signals via the means for transmitting DSL signals and via the first means to the means for broadcasting.

37. A system for improving transmission of DSL signals, the system comprising:
a plurality of local loops, including
a first local loop for transmitting control signals and power, and
a second local loop for transmitting control signals and power;
a plurality of loop extenders for amplifying DSL signals, coupled to the plurality of local loops, each loop extender including
a POTS loading coils coupled to a local loop from the plurality of local loops,
DSL amplification circuitry coupled to the local loop via bypass switches,
an AMADC coupled to the DSL amplification circuitry via diagnostic lines and control lines, for sampling DSL signals via the diagnostic lines and controlling the DSL amplification circuitry via the control lines, and
a DCP coupled to the local loop and the AMADC for processing the control signals received via the local loop and processing the sampled DSL signals received via the AMADC;
a loop extender communications module having a power supply coupling the first local loop and the second local loop to the plurality of loop extenders for providing power and broadcasting the control signals to the plurality of loop extenders, the loop extender communications module having a power supply including
a second modem for communication with the plurality of loop extenders; and
a central office controller having a power supply coupled to the first local loop via a first transformer and coupled to the second local loop via a second transformer for providing power to the loop extender communications module having a power supply, generating the control signals, and sending the control signals to the loop extender communications module having a power supply, the central office controller having a power supply including
a first modem for communication with the loop extender communications module having a power supply,
a processor coupled to the first modem, and
loop extender management software executable by the processor for generating the control signals wherein the power or the control signals are supplied as a voltage between the first local loop and the second local loop.

38. The system of claim 37, wherein the first modem and the second modem communicate in a voice-frequency band.

39. The system of claim 38, wherein the processor sends the control signals to the first modem for transmission over the first local loop and the second local loop.

40. The system of claim 39, wherein the second modem receives the control signals and broadcasts the received control signals to the plurality of loop extenders via the plurality of local loops.

41. The system of claim 40, wherein the DCP processes the sampled DSL signals to compute average power.

42. The system of claim 40, wherein the DCP processes the sampled DSL signals to compute peak power.

43. The system of claim 40, wherein the DCP processes the sampled DSL signals to compute root-mean-square power.

44. The system of claim 40, wherein the DCP processes the sampled DSL signals to compute power spectral density.

45. The system of claim 40, wherein each loop extender further includes a bypass relay for coupling the DCP to the bypass switches.

46. The system of claim 45, wherein the DCP, upon receiving control signals, uncouples the DSL amplification circuitry from the local loop by activating a deactivated bypass relay.

47. The system of claim 45, wherein the DCP, upon receiving control signals, couples the DSL amplification circuitry to the local loop by deactivating an activated bypass relay.

48. The system of claim 40, wherein the DCP, upon receiving control signals, instructs the AMADC to select switch states of the DSL amplification circuitry for improving performance of the DSL amplification circuitry.

49. The system of claim 40, wherein the DCP, upon processing the sampled DSL signals, instructs the AMADC to select switch states of the DSL amplification circuitry for improving performance of the DSL amplification circuitry.

* * * * *